United States Patent
Yoo et al.

(10) Patent No.: US 12,399,252 B2
(45) Date of Patent: Aug. 26, 2025

(54) ASSISTANT APPARATUS FOR IMPROVING RADAR SIGNAL DETECTION PERFORMANCE

(71) Applicant: ELECTRONICS AND TELECOMMUNICATIONS RESEARCH INSTITUTE, Daejeon (KR)

(72) Inventors: Sung Jin Yoo, Daejeon (KR); Hyung Ju Kim, Daejeon (KR); Myung Sun Song, Daejeon (KR); Byung Jang Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 564 days.

(21) Appl. No.: 17/866,727

(22) Filed: Jul. 18, 2022

(65) Prior Publication Data

US 2023/0021567 A1 Jan. 26, 2023

(30) Foreign Application Priority Data

Jul. 26, 2021 (KR) .......................... 10-2021-0097609

(51) Int. Cl.
*G01S 7/02* (2006.01)
*G01S 13/931* (2020.01)

(52) U.S. Cl.
CPC .............. *G01S 7/02* (2013.01); *G01S 13/931* (2013.01)

(58) Field of Classification Search
CPC .. G01S 7/02; G01S 7/40; G01S 13/931; G01S 13/74; G01S 13/75; G01S 13/751; G01S 13/82
See application file for complete search history.

(56) References Cited

U.S. PATENT DOCUMENTS

| 4,218,680 A | * | 8/1980 | Kennedy | ............... G01S 13/767 342/51 |
| 5,351,054 A | * | 9/1994 | Fredericks | ............ G01S 13/913 342/170 |

(Continued)

FOREIGN PATENT DOCUMENTS

| KR | 10-2022284 B1 | 9/2019 |
| KR | 10-2077584 B1 | 2/2020 |
| WO | 2011/017370 A1 | 2/2011 |

*Primary Examiner* — Peter M Bythrow
(74) *Attorney, Agent, or Firm* — LRK PATENT LAW FIRM

(57) ABSTRACT

Disclosed is a radar detection assistant apparatus for increasing detection accuracy when detecting an object using a radar detection device. The radar detection assistant apparatus includes a radar signal receiver for adjusting a radar candidate signal received through a reception antenna to a predetermined magnitude and filtering out a signal other than the radar candidate signal, a radar signal analyzer for receiving the radar candidate signal from the radar signal receiver and determining whether or not the radar candidate signal is a preset radar signal, a radar signal production controller for generating a control signal for an assistant apparatus production signal or an assistant apparatus reproduction signal on the basis of at least one of pieces of information on a type, a bandwidth, and a period of the radar candidate signal received from the radar signal analyzer, and a radar signal producer.

18 Claims, 14 Drawing Sheets

(56) References Cited

U.S. PATENT DOCUMENTS

| | | | | |
|---|---|---|---|---|
| 5,518,400 A * | 5/1996 | Otoide | | G01S 7/4052 |
| | | | | 434/4 |
| 5,767,802 A * | 6/1998 | Kosowsky | | G01S 13/78 |
| | | | | 342/25 C |
| 6,067,042 A * | 5/2000 | Lee | | G01S 7/4052 |
| | | | | 342/175 |
| 6,577,266 B1 * | 6/2003 | Axline | | G01S 13/9029 |
| | | | | 342/51 |
| 6,611,224 B1 * | 8/2003 | Nysen | | G06K 19/0672 |
| | | | | 342/175 |
| 6,791,489 B1 * | 9/2004 | Richardson | | G01S 13/765 |
| | | | | 342/51 |
| 6,861,971 B2 * | 3/2005 | Russo | | G01S 13/90 |
| | | | | 342/51 |
| 7,221,308 B2 * | 5/2007 | Burton | | G01S 13/767 |
| | | | | 342/51 |
| 8,190,162 B2 * | 5/2012 | Hansen | | H04B 15/02 |
| | | | | 342/131 |
| 8,384,582 B2 * | 2/2013 | Chiassarini | | G01S 13/767 |
| | | | | 345/44 |
| 8,405,539 B2 * | 3/2013 | Saitto | | G01S 13/9029 |
| | | | | 342/51 |
| 8,786,489 B2 | 7/2014 | Patrick | | |
| 8,994,583 B2 * | 3/2015 | Bruce | | G01S 13/584 |
| | | | | 342/42 |
| 10,656,264 B2 * | 5/2020 | Lee | | G01S 13/886 |
| 10,866,315 B2 * | 12/2020 | Siemes | | G01S 13/325 |
| 2005/0270227 A1 | 12/2005 | Stephens | | |
| 2010/0277364 A1 * | 11/2010 | Saitto | | G01S 13/78 |
| | | | | 342/25 R |
| 2011/0234447 A1 * | 9/2011 | Patrick | | G01S 7/025 |
| | | | | 342/44 |
| 2012/0092205 A1 * | 4/2012 | Bourdelais | | G01S 7/006 |
| | | | | 342/21 |
| 2012/0127021 A1 * | 5/2012 | Gravelle | | G01S 7/023 |
| | | | | 342/130 |
| 2014/0225761 A1 * | 8/2014 | Garrec | | G01S 13/872 |
| | | | | 342/51 |
| 2015/0198706 A1 | 7/2015 | Dolgin | | |
| 2020/0029236 A1 * | 1/2020 | Segev | | H04L 5/0051 |
| 2021/0223752 A1 * | 7/2021 | Degani | | G01S 7/4086 |

* cited by examiner

FIG. 3A
FIG. 3B
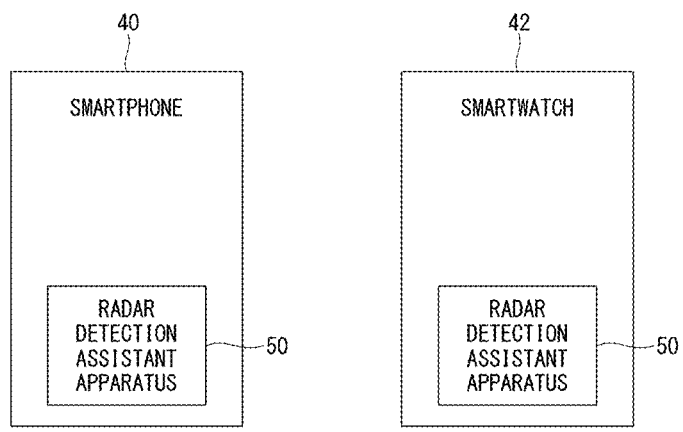
FIG. 4
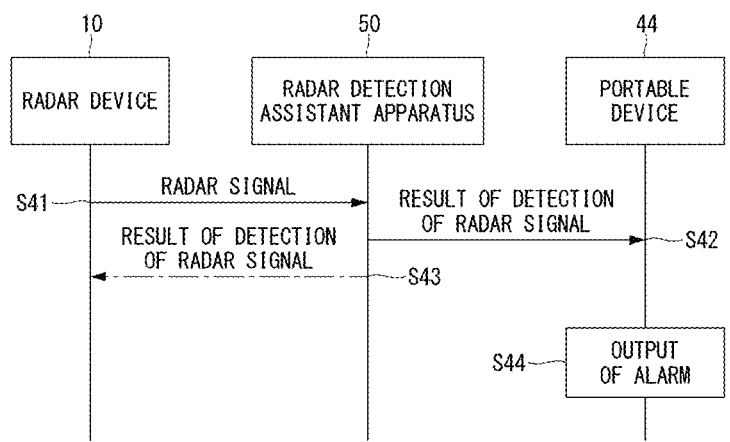

ASSISTANT APPARATUS FOR IMPROVING RADAR SIGNAL DETECTION PERFORMANCE

CROSS-REFERENCE TO RELATED APPLICATION

The present application claims priority to Korean Patent Application No. 10-2021-0097609, filed Jul. 26, 2021, the entire contents of which is incorporated herein for all purposes by this reference.

BACKGROUND

1. Technical Field

The present disclosure relates to an assistant apparatus for improving a radar signal detection performance and, more particularly, to a radar detection assistant apparatus for increasing detection accuracy when detecting an object using a radar device, such as a vehicle radar mounted in an autonomous vehicle or the like.

2. Description of Related Art

With the development of technologies for autonomous vehicles, sensing technologies employed in the autonomous vehicles have been developed. Particularly, a radar sensor, along with a camera and a LiDAR sensor, is one of the important sensors necessary to increase the safety of autonomous traveling. Unlike the camera or the LiDAR sensor, the radar sensor has the advantage of stably being operable in rainy or snowy weather.

However, the radar sensor has lower resolution than the camera or the LiDAR sensor. In addition, the radar sensor extracts a radar cross section (RCS) of an object while the camera or the LiDAR sensor extracts exterior appearance information of the object. For this reason, it is difficult for a person to interpret radar information obtained by the radar sensor as is.

In recent years, with the development of deep learning technologies, the deep learning technologies have been actively used in the autonomous vehicles. A lot of data are absolutely necessary to increase the accuracy of the deep learning technology. As described above, since it is difficult for a person to interpret the information obtained by the radar sensor, it is difficult to collect a lot of data. Although an algorithm in which a person categorizes radar images in a conventional manner without using deep learning may be developed, the radar sensor used above the ground, like a vehicle radar, has a difficult problem of increasing accuracy that is due to a large amount of clutter.

SUMMARY

An object of the present disclosure, which is made to solve the problem in the related art, is to provide an assistant apparatus for improving a radar signal detection function, the assistant apparatus being capable of increasing a detection performance even if a low-complexity radar detection algorithm is used.

Another object of the present disclosure is to provide an assistant apparatus for improving a radar signal detection function, the assistant apparatus being capable of being realized as one integrated with a portable device, such as a smartphone or a smartwatch, and thus of exposing a user carrying the portable device to a radar mounted in a vehicle.

According to an aspect of an exemplary embodiment, an assistant apparatus for improving radar signal detection performance, the assistant apparatus comprising: a radar signal receiver adjusting a radar candidate signal received through a reception antenna to a predetermined magnitude and filtering out a signal other than the radar candidate signal; a radar signal analyzer receiving the radar candidate signal from the radar signal receiver and determining whether or not the radar candidate signal is a preset radar signal; a radar signal production controller generating a control signal for an assistant apparatus production signal or an assistant apparatus reproduction signal on the basis of at least one of pieces of information on a type, a bandwidth, and a period of the radar candidate signal received from the radar signal analyzer; and a radar signal producer activated by the radar signal production controller, generating the assistant apparatus production signal or the assistant apparatus reproduction signal according to the control signal of the radar signal production controller, and transmitting the assistant apparatus reproduction signal or the assistant apparatus production signal to the outside through a transmission antenna.

The radar signal analyzer may determine whether or not the radar candidate signal is an actual radar signal, using a matched filter, a correlation technique, or a frequency characteristic of the radar signal.

The radar signal producer may comprise: a transmission power adjustment unit adjusting output signal power of a transmission amplifier included in the radar signal producer, on the basis of the control signal of the radar signal analyzer.

The radar signal analyzer may compute a gain of the transmission amplifier in a case where the radar signal is detected, and sets the gain of the transmission amplifier to zero or powers off the transmission amplifier in a case where the radar signal is not detected.

The radar signal receiver may comprise: a reception filter connected to the reception antenna; a reception amplifier connected to the reception filter; and an AGC (automatic gain control) uniformly controlling an output of the reception amplifier.

The radar signal analyzer may receive the radar candidate signal at a predetermined level adjusted by the AGC from the reception amplifier and transfers a magnitude of a radar signal detected from the radar candidate signal, or radar signal information including the magnitude of the radar signal, to the transmission power adjustment unit.

The transmission power adjustment unit may estimate received signal power of the radar signal using a control value of the AGC.

The transmission power adjustment unit may decrease a magnitude or strength of the assistant apparatus production signal or the assistant apparatus reproduction signal in a manner that is smaller than a predetermined magnitude or strength, using a small gain, in a case where the magnitude of the radar signal or strength of the radar signal that corresponds to the magnitude of the radar signal is above a first reference value, and increases the magnitude or the strength of the assistant apparatus production signal or the assistant apparatus reproduction signal in a manner that is greater than a currently set magnitude or strength of the radar signal, using a large gain, in a case where the magnitude of the radar signal or the strength of the radar signal that corresponds to the magnitude of the radar signal is below a second reference value.

The assistant apparatus may further comprise a time delay compensator compensating for a time delay of the radar signal received from the radar signal receiver by adding a preset magnitude and outputting the resulting radar signal.

The time delay compensator may compute an amount of change in a beat frequency that corresponds to the time delay, performs up-conversion of the amount of change in the beat frequency through a mixer, and generates the assistant apparatus production signal.

The time delay compensator may comprise an oscillator producing a reference frequency; and a mixer compensating for the time delay of the radar signal using the reference frequency of the oscillator and outputting the assistant apparatus production signal.

The assistant apparatus may further comprise a signal transformer transforming the radar signal received from the radar signal receiver to a preset form and outputting the resulting radar signal.

The assistant apparatus reproduction signal resulting from the transformation by the signal transformer may have a different slope of a chirp signal than a target object reflection signal resulting from a radar transmission signal of an external radar device or a radar sensor reflecting off a target object, and thus is recognized, by the radar device, as a form that extends over a long distance in a radio-wave radial direction.

The slope of the chirp signal may be preset to vary from one type of the target object to another.

The signal transformer may operate as a delay compensator that compensates for a time delay of the radar signal by adding a preset magnitude and outputs the resulting radar signal when the slope of the chirp signal is zero and the chirp signal has the same slope as the target object reflection signal.

The signal transformer may comprise a chirp signal producer producing a chirp signal; and a mixer outputting the assistant apparatus reproduction signal by transforming the radar signal using the chirp signal of the chirp signal producer.

The assistant apparatus may further comprise a transmission timing controller functioning in such a manner that the assistant apparatus production signal or the assistant apparatus reproduction signal flickers, by selectively switching a signal production state on or off in a radar signal-detection section that is one of the radar signal-detection section and a radar signal-non-direction section.

The transmission timing controller may differently control a section in which the flickering occurs and a section in which the flickering does not occur, according to a type of a target object, in such a manner that the type of the target object that is a target for recognition is distinguished in the radar device.

The assistant apparatus may further comprise a transmission amplifier controller controlling operation of the radar signal generator or of a transmission amplifier of the radar signal generator on the basis of an output signal of a transmission power adjustment unit corresponding to the radar signal production controller or the radar signal production controller and an output signal of the transmission timing controller.

The assistant apparatus may be mounted in or attached to each of the portable devices including a smartphone and a smartwatch.

BRIEF DESCRIPTION OF THE DRAWINGS

FIG. 3A and FIG. 3B are schematic block diagrams for explaining portable devices including the radar detection assistant apparatus of FIG. 2.

FIG. 4 is a flowchart illustrating an operation that may be performed in the portable device including the radar detection assistant apparatus in FIG. 2.

DETAILED DESCRIPTION OF THE INVENTION

Figure 1:
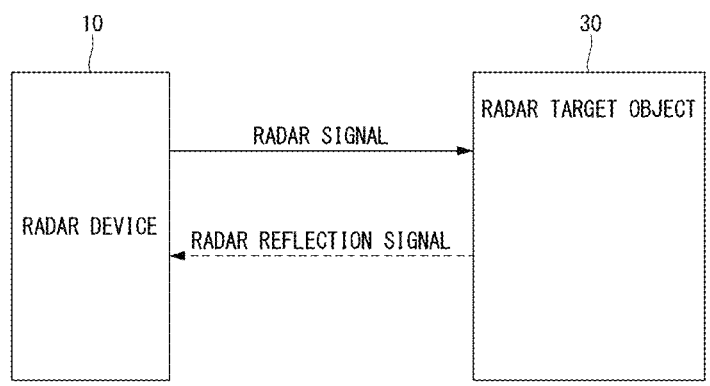
FIG. 1 is a schematic block diagram illustrating a configuration of a general radar system.

Exemplary embodiments of the present disclosure are disclosed herein. However, specific structural and functional details disclosed herein are merely representative for purposes of describing exemplary embodiments of the present disclosure, and exemplary embodiments of the present disclosure may be embodied in many alternate forms and should not be construed as limited to exemplary embodiments of the present disclosure set forth herein.

Accordingly, while the invention is susceptible to various modifications and alternative forms, specific embodiments thereof are shown by way of example in the drawings and will herein be described in detail. It should be understood, however, that there is no intent to limit the invention to the particular foams disclosed, but on the contrary, the invention is to cover all modifications, equivalents, and alternatives falling within the spirit and scope of the invention. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a" and "an" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by those of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
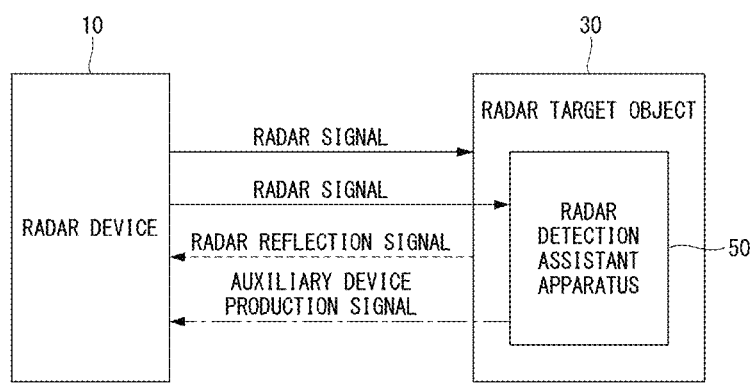
FIG. 2 is a schematic block diagram illustrating a configuration of a radar system that uses an assistant apparatus for improving radar signal detection performance (hereinafter referred to simply as a "radar detection assistant apparatus") according to an embodiment of the present disclosure.

FIG. 1 is a schematic block diagram illustrating a configuration of a general radar system. FIG. 2 is a schematic block diagram illustrating a configuration of a radar system that uses a radar detection assistant apparatus (hereinafter referred to simply as an "assistant apparatus") for improving radar signal detection performance according to an embodiment of the present disclosure.

With reference to FIG. 1, a radar device 10, as a comparative example, produces a radar signal. The produced signal reflects off a radar target object 30. The radar device 10 interprets a radar reflection signal and extracts a distance between the radar device 10 and the radar target object or azimuth information.

At this point, a magnitude of the radar reflection signal is determined by a radar cross section (RCS) of the radar target object. The target object, such as a vehicle, which has a large size and whose material is iron, appears as a target object having a large RCS. In contrast, a human or an animal appears as a target object having a larger RCS than the vehicle. Therefore, in an area where there are a large number of vehicles in the vicinity, performance for detecting a human or animal may be greatly decreased.

As illustrated in FIG. 2, the radar device 10 according to the present embodiment may produce the radar signal and then may receive the radar reflection signal and an assistant apparatus production signal from the radar target object 30 including an assistant apparatus 50.

That is, the radar device 10 transmits the radar signal and receives the radar reflection signal reflecting off the radar target object 30. The radar signal here is generally transmitted to the entire radar target object 30. Thus, in a case where the assistant apparatus 50 is included in the radar target object 30, the assistant apparatus production signal may also be received from the assistant apparatus 50.

The assistant apparatus 50 generates the assistant apparatus production signal and transmits the generated assistant apparatus production signal using information on the received radar signal, that is, radar signal information and an active element thereinside. A magnitude of a signal produced in the assistant apparatus 50 is adjustable by a power amplifier of the assistant apparatus 50 and is basically greater than the magnitude of the radar reflection signal.

In addition, the assistant apparatus 50 may artificially transform the signal in such a manner as to be clearly distinguishable from clutter.

As described above, the radar device 10 may receive the radar reflection signal reflecting off the radar target object 30 and the assistant apparatus production signal at the same time and may extract information, such as a position, an azimuth, and the like of an object, by signal-processing the received signals.

In addition, like a general radar device, the radar device 10 may be used in extracting RCS-varying properties through radar reflection signal information and thus categorizing objects. At this point, in a case only the radar reflection signal is used, when an object is at a remote distance and there is much clutter in the vicinity, the object may not be detected in some cases. However, in a case where the assistant apparatus production signal is used, the accuracy of a measured distance and the accuracy of categorization may be greatly increased.

FIG. 3A and FIG. 3B are schematic block diagrams for explaining portable devices including the radar detection assistant apparatus of FIG. 2. FIG. 4 is a flowchart illustrating an operation that may be performed in the portable device including the radar detection assistant apparatus in FIG. 2.

The assistant apparatus 50 may be used as a standalone device but, as illustrated in FIG. 3A and FIG. 3B, may be built into a smartphone 40 or a smartwatch 42 for better use.

That is, many persons carry or can carry the smartphone 40 or the smartwatch 42 with them, and therefore, the mounting of the assistant apparatus 50 in the smartphone 40 or the smartwatch 42 can eliminate the inconvenience of separately having to carry the radar detection assistant apparatus.

In addition, a magnitude, a period, and the like of the signal produced in the assistant apparatus 50 that functions as one component of the smartphone 40 or the smartwatch 42 may be easily adjusted. The function of the assistant apparatus 50 may be turned on or off whenever necessary. Thus, user convenience can be increased.

In addition, as illustrated in FIG. 4, when receiving the radar signal through an antenna (S41) and thus detecting the radar signal, the assistant apparatus 50 may generate the assistant apparatus production signal and may transmit the generated assistant apparatus production signal to the outside (S43). At this time, the assistant apparatus 50 may transmit a result of the detection of the radar signal to a portable device 44, such as a user's smartphone or smartwatch before or after transmitting the assistant apparatus production signal to the outside (S42).

In this case, the portable device 44 may output a preset alarm in advance. The alarm may be output in the form of letters for display, light, sound, vibration, or a combination thereof according to the user's setting of the portable device 44.

According to the present embodiment, with the signal from the assistant apparatus 50, the user of the portable device 44 can be notified that there is a radar-installed moving apparatus in the vicinity, such as a vehicle, for example, an autonomous vehicle, or a moving robot, and accordingly can recognize and thus avoid a hazardous situation to occur in the vicinity.

Figure 5:
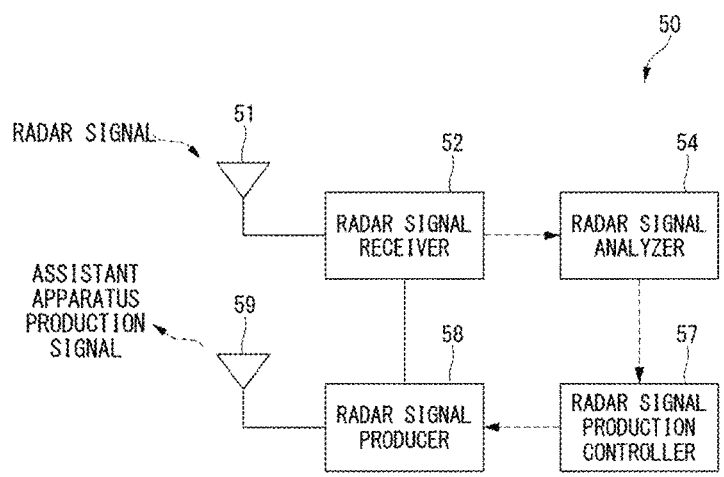
FIG. 5 is a schematic block diagram illustrating a configuration of a radar detection assistant apparatus according to a first embodiment in FIG. 2.

FIG. 5 is a schematic block diagram illustrating a configuration of a radar detection assistant apparatus according to a first embodiment in FIG. 2.

With reference to FIG. 5, the assistant apparatus 50 includes a radar signal receiver 52 connected to a reception antenna 51, a radar signal analyzer 54 connected to the radar signal receiver 52, a radar signal production controller 57 connected to the radar signal analyzer 54, and a radar signal producer 58 connected to the radar signal receiver 52, the radar signal production controller 57, and a transmission antenna 59.

The radar signal receiver 52 adjusts the received radar signal to a predetermined magnitude and filters out a signal other than the radar signal. The radar signal receiver 52 transfers magnitude information of the radar signal, as well as the radar signal, to the radar signal analyzer 54. The radar signal received by the radar signal receiver 52 may correspond to a radar candidate signal that is not yet determined as a proper radar signal.

The radar signal analyzer 54 determines on the basis of the radar signal and the magnitude information of the radar signal whether or not the radar signal is currently present. In order to determine whether or not the radar signal is present, the radar signal analyzer 54 may use a matched filter or a correlation technique or may use a frequency characteristic of the radar signal. In a case where the radar signal is present, the radar signal analyzer 54 extracts information, such as a type, a magnitude, a bandwidth, a period, and the like of the radar signal. When it is determined that the radar signal is currently received, the radar signal analyzer 54 transfers relevant information to the radar signal production controller 57.

On the basis of the information, such as the type, the bandwidth, the period, and the like of the radar signal, the radar signal production controller 57 transfers the type of the radar signal to the radar signal producer 58 and activates an electric power amplifier of the radar signal producer 58.

The radar signal producer 58 generates the assistant apparatus production signal according to the signal and the information of the radar signal production controller 57 and transmits the generated assistant apparatus production signal to the outside through the transmission antenna 59. At this time, the radar signal producer 58 may independently generate a transmission signal, using only the information received from the radar signal production controller 57, but is not limited to the information received therefrom. Whenever necessary, the radar signal producer 58 may produce the transmission signal using the signal received from the radar signal receiver 52.

In addition, the above-described radar signal production controller 57 may determine to what form the radar signal is produced, according to the type, the magnitude, the period, and the like of the radar signal. Particularly, on the basis of magnitude information of the received radar signal, the radar signal production controller 57 may determine the magnitude of the signal that is produced by the radar signal producer 58.

For example, in a case where the received radar signal has a great magnitude, this means that a distance between the radar device 10 and the assistant apparatus 50 is small. Accordingly, the radar signal production controller 57 may operate in such a manner as to produce a low-power signal. Accordingly, the radar device 10 may be prevented from receiving an excessively high-power signal.

In addition, conversely, in a case where the received radar signal has a small magnitude, the radar signal production controller 57 may recognize that the distance between the radar device 10 and the radar detection assistant apparatus 50 is great, and, according to a preset processing procedure, may operate in such a manner that a high-power signal is produced. Accordingly, in a case where the radar device 10 and the assistant apparatus 50 are positioned a great distance apart, the radar signal production controller 57 may operate in such a manner that the radar device 10 possibly receives the signal.

Figure 6:
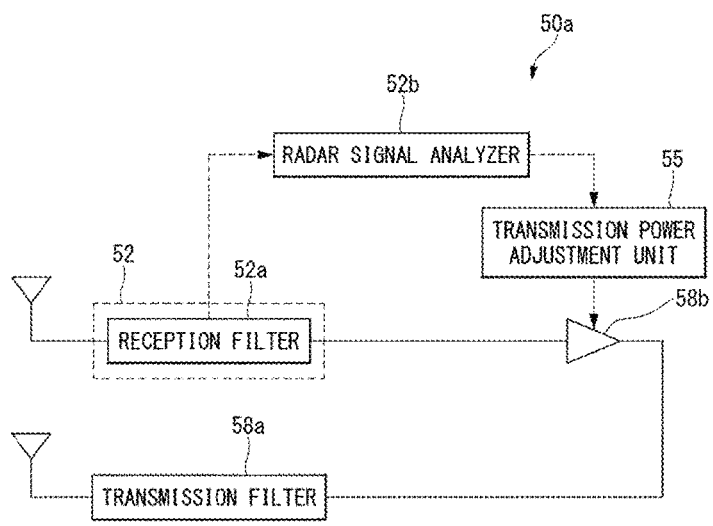
FIG. 6 is a schematic block diagram illustrating a configuration of a radar detection assistant apparatus according to a second embodiment in FIG. 2.
Figure 7:
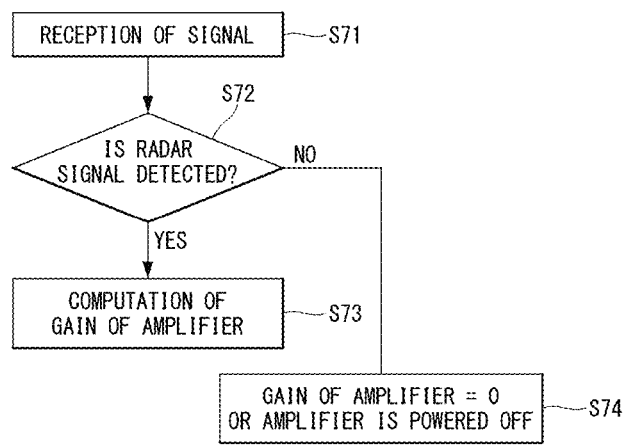
FIG. 7 is a flowchart that is referred to for description of the principal operational principle of the radar detection assistant apparatus in FIG. 6.

FIG. 6 is a schematic block diagram illustrating a configuration of a radar detection assistant apparatus according to a second embodiment in FIG. 2. FIG. 7 is a flowchart that is referred to for description of the principal operational principle of the radar detection assistant apparatus in FIG. 6.

With reference to FIGS. 6 and 7, a radar detection assistant apparatus 50a is an apparatus that uses a transmission power adjustment unit, and includes the radar signal receiver 52, the radar signal analyzer 54, a transmission power adjustment unit 55, an amplifier 58b, and a transmission filter 58a. The radar signal receiver 52 may include a reception filter 52a, and the radar signal producer may include the amplifier 58b and the transmission filter 58a.

The radar signal that is received from the reception antenna by the assistant apparatus 50a passes through the reception filter 52a (S71). The reception filter 52a removes a signal having a different bandwidth than the radar signal.

The radar signal analyzer 54 determines whether or not the radar signal is included in currently received signals (S72). In a case where the radar signal is included in the received signals, the radar signal analyzer 54 computes the magnitude of the received radar signal.

The transmission power adjustment unit 55 computes a gain of the amplifier 58b on the basis of the magnitude of the radar signal that is computed by the radar signal analyzer 54 (S73). In a case where the radar signal received by the reception antenna is above a preset reference value, the transmission power adjustment unit 55 may reduce a magnitude of the assistant apparatus production signal using a relatively low gain within a preset gain range. In addition, in a case where the magnitude of the radar signal received by the reception antenna is at or below the reference value, the transmission power adjustment unit 55 may increase the magnitude of the assistant apparatus production signal using a relative high gain.

In a case where the radar signal is not detected from among the received signals, the assistant apparatus 50a may not produce the assistant apparatus production signal. At this time, the assistant apparatus 50a may perform control in such a manner that the gain of the amplifier 58b is zero or may power off the amplifier 58b (S74).

That is, described above, the assistant apparatus 50a may compute the gain of the amplifier 58a when the radar signal is detected and may set the gain of the amplifier 58a to 0 or power off the amplifier 58a when the radar signal is not detected.

The gain of the amplifier 58b may be computed using Equation 1 or 2.

$$\text{Gain} = \frac{\alpha}{\text{Received Radar Signal Power}} + \beta \quad \text{[Equation 1]}$$

$$\text{Gain} = \gamma - \delta \times \text{Received Radar signal Power} \quad \text{[Equation 2]}$$

In Equations 1 and 2, $\alpha$, $\beta$, $\gamma$, $\delta$ are all constants.

The assistant apparatus production signal having an output of the amplifier 58b of which the gain is adjusted by the transmission power adjustment unit 55 may be transmitted from the transmission antenna to the outside through the transmission filter 58a.

The assistant apparatus according to the present embodiment has an advantage of being realized in a simple form.

Figure 8:
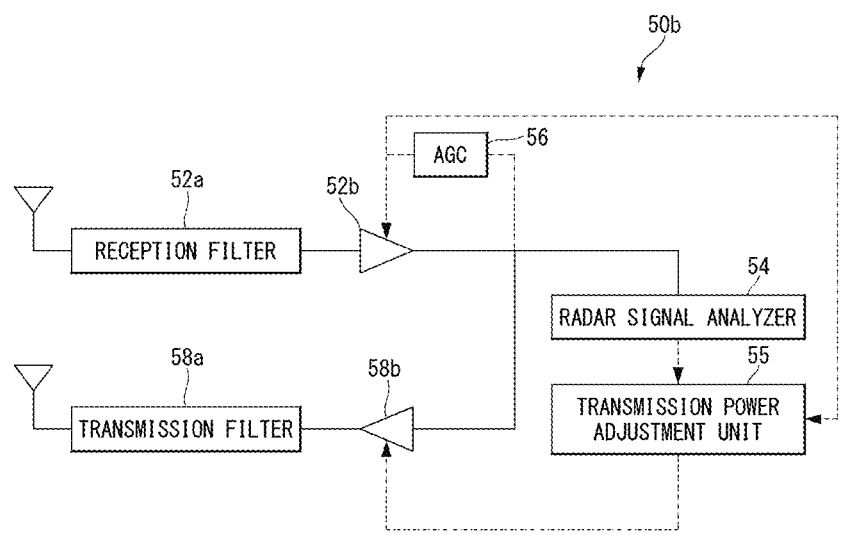
FIG. 8 is a schematic block diagram illustrating a configuration of a radar detection assistant apparatus according to a third embodiment in FIG. 2.

FIG. 8 is a schematic block diagram illustrating a configuration of a radar detection assistant apparatus according to a third embodiment in FIG. 2.

With reference to FIG. 8, an assistant apparatus 50b includes the reception filter 52a, a first amplifier 52b, the radar signal analyzer 54, the transmission power adjustment unit 55, an automatic gain control (hereinafter abbreviated to AGC) 56, a second amplifier 58b, and the transmission filter 58a.

The assistant apparatus 50b according to the present embodiment further includes a reception amplifier. The reception filter 52a and the first amplifier 52b may be configured to correspond to the radar signal receiver, and the transmission filter 58a and the second amplifier 58b may be configured to correspond to the radar signal producer.

Received electric power having a predetermined magnitude is necessary in order to increase detection performance of the radar signal analyzer 54. To this end, using the AGC 56 that is a closed-loop feedback regulating circuit, the first amplifier 52b that is a reception amplifier makes it possible to keep a magnitude of a signal to be input into the radar signal analyzer 54 uniform. Accordingly, analysis performance of the radar signal analyzer 54 can be improved.

In this case, instead of directly computing received radar signal power, the transmission power adjustment unit 55 may estimate received signal power using a control value of the AGC 56. In terms of controlling an output of a transmission amplifier, the transmission power adjustment unit 55 may correspond to a means of or a component for performing one function of the radar signal production controller 57.

The basic operational principle of a radar is to measure a distance using a time delay between radio waves. Therefore, the occurrence of a long time delay while generating the signal to be produced in the radar detection assistant apparatus may prevent the radar device 10 from precisely operating.

Therefore, in practice, a time delay between the radar signal received by the radar detection assistant apparatus and the assistant apparatus production signal needs to be minimized. When the time delay inevitably occurs, with a separate delay compensator, the time delay can be compensated for.

Figure 9:
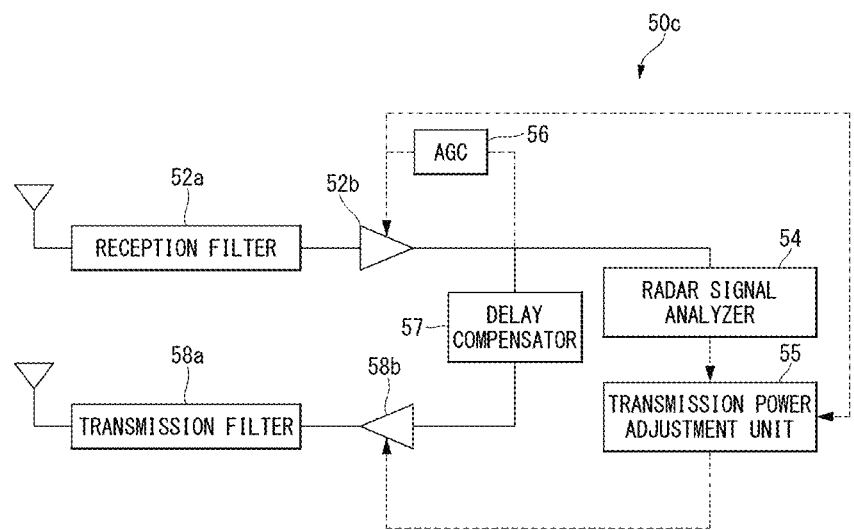
FIG. 9 is a schematic block diagram illustrating a configuration of a radar detection assistant apparatus according to a fourth embodiment in FIG. 2.
Figure 10:
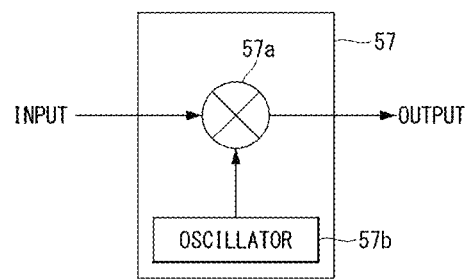
FIG. 10 is a schematic block diagram illustrating a delay compensator that may be employed in the radar detection assistant apparatus in FIG. 9.
Figure 11:
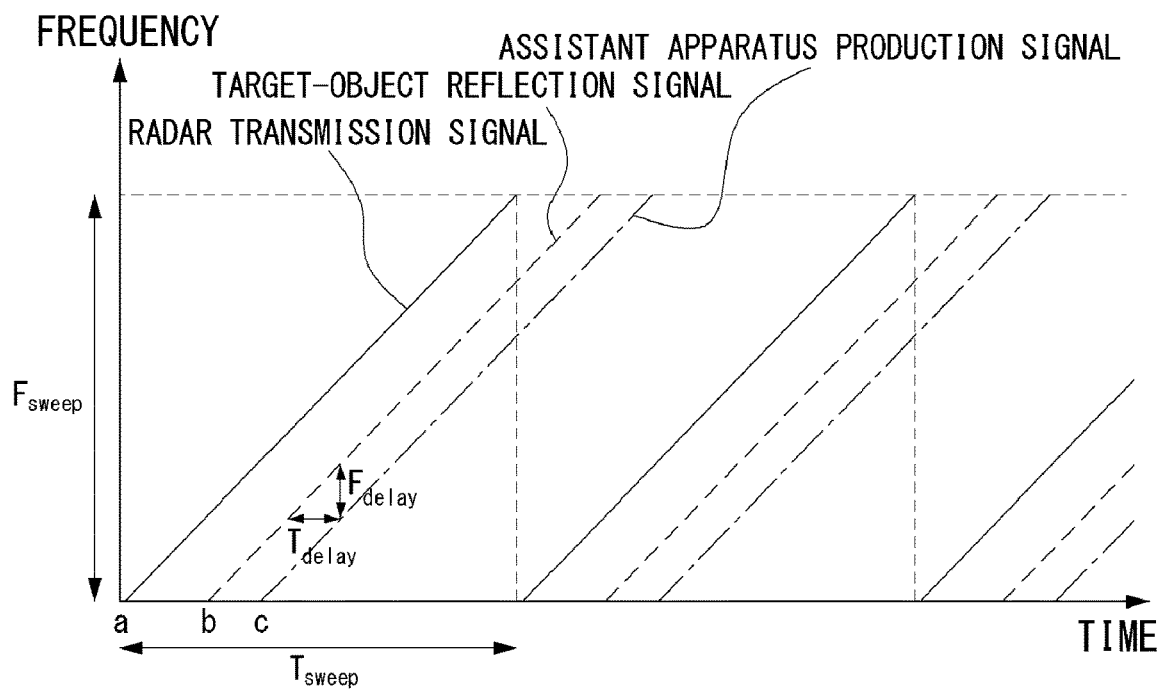
FIG. 11 is a graph showing a frequency modulated continuous wave (FMCW) radar signal that is available before the delay compensator of the radar detection assistant apparatus in FIG. 9 operates.
Figure 12:
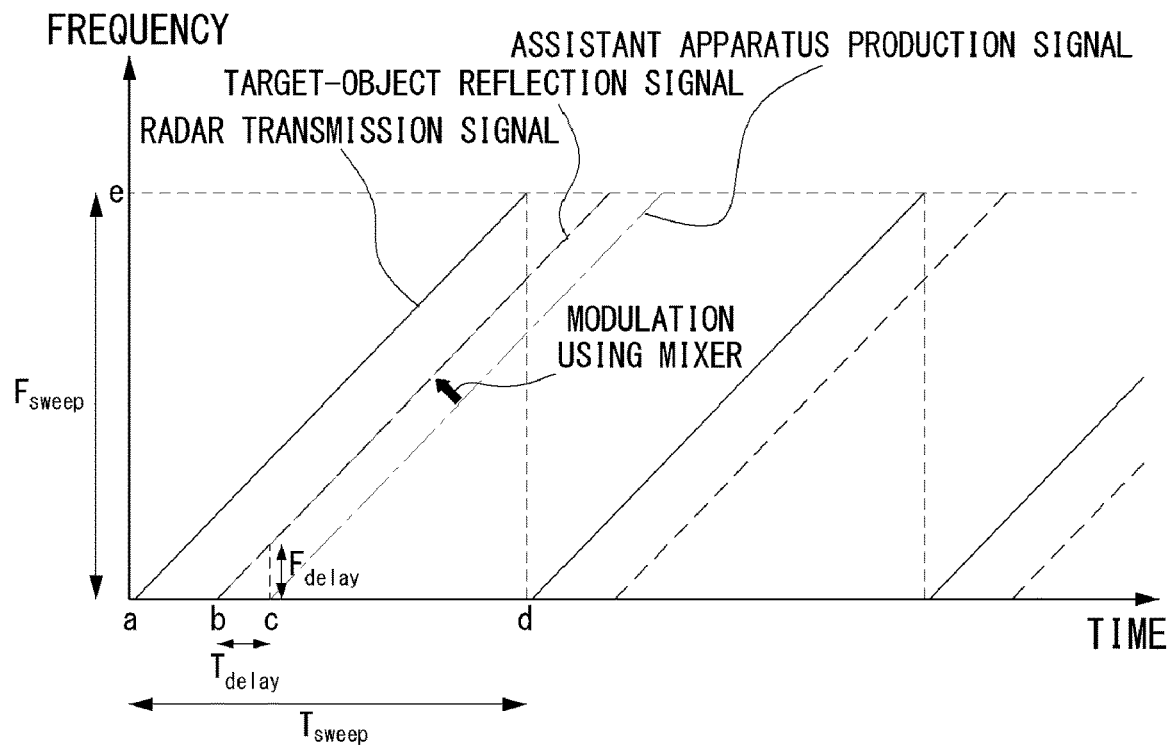
FIG. 12 is a graph showing the FMCW radar signal that results after the delay compensator of the radar detection assistant apparatus in FIG. 9 operates.

FIG. 9 is a schematic block diagram illustrating a configuration of a radar detection assistant apparatus according to a fourth embodiment in FIG. 2. FIG. 10 is a schematic block diagram illustrating a delay compensator that may be employed in the radar detection assistant apparatus in FIG. 9. FIG. 11 is a graph showing a frequency modulated continuous wave (FMCW) radar signal that is available before the delay compensator of the radar detection assistant apparatus in FIG. 9 operates. Also, FIG. 12 is a graph showing the FMCW radar signal that results after the delay compensator of the radar detection assistant apparatus in FIG. 9 operates.

With reference to FIG. 9, an assistant apparatus 50c includes the reception filter 52a connected to the reception antenna, the first amplifier 52b connected to the reception filter 52a, a delay compensator 57 connected to the first amplifier 52b, the amplifier 58b connected to the delay compensator 57, the transmission filter 58a connected between the second amplifier 58b and the transmission antenna, the AGC combined with the first amplifier 52b, the radar signal analyzer 54 connected to an output terminal of the first amplifier 52b, and the transmission power adjustment unit 55 connected to the radar signal analyzer 54.

The AGC 56 controls operation of the first amplifier 52b in such a manner that the magnitude of the signal being input from the first amplifier 52b into the radar signal analyzer 54 is kept uniform. The radar signal analyzer 54 detects the radar signal from the signal from the first amplifier 52b. The transmission power adjustment unit 55 estimates the received signal power using the control value of the AGC 56 and controls an output of the second amplifier 58b that is a transmission amplifier. The reception filter 52a and the first amplifier 52b may correspond to the radar signal receiver, and the transmission filter 58a and the second amplifier 58b may correspond to the radar signal producer.

The delay compensator 57, as illustrated in FIG. 10, includes a mixer 57a connected between an input and an output and an oscillator 57b providing a reference frequency to the mixer 57a.

In the case of a frequency modulated continuous wave (FMCW) radar, a distance is measured by computation with a beat frequency of the radar reflection signal. Therefore, in the case of the FMCA radar, the assistant apparatus may compute or estimate an amount of change in the beat frequency that corresponds to the time delay, may perform up-conversion of the amount of change in the beat frequency through the mixer 57a, and may generate and transmit the radar reflection signal or the assistant apparatus production signal.

At this point, a frequency $F_{delay}$ of an oscillator 57b of the delay compensator 57 that results from considering the time delay may be computed using following Equation 3.

$$F_{delay} = \frac{F_{sweep} T_{delay}}{T_{sweep}} \quad \text{[Equation 3]}$$

Where $F_{sweep}$ depicts a bandwidth of a chirp signal of the FMCW, $T_{sweep}$ depicts a period of the chirp signal, and $T_{delay}$ depicts the time delay due to the radar detection assistant apparatus.

As illustrated in FIG. 11, the FMCW radar receives a target-object reflection signal that results from the radar signal (a radar transmission signal) reflecting off the target object, and receives the assistant apparatus production signal that is transmitted by the assistant apparatus 50c. At this point, the assistant apparatus production signal that is available before the time delay is compensated for may have a prescribed first time delay $T_{delay}$ and a prescribed first frequency delay $F_{delay}$, compared with the target-object reflection signal.

As illustrated in FIG. 12, the assistant apparatus 50c may modulate an input radar signal through the mixer 57a and may output the result. In order to modulate the radar signal, the mixer 55a may generate the assistant apparatus production signal that results from compensating for the first time delay. In this manner, the radar detection assistant apparatus 50c may transmit the assistant apparatus production signal that results from compensating for the time delay and thus reflecting at substantially the same timing as the target-object reflection signal, through the transmission antenna.

According to the present embodiment, the radar detection assistant apparatus may operate in such a manner that amplification of the magnitude of the radar signal increases the probability that the radar will detect the radar detection assistant apparatus or the target object in which the radar detection assistant apparatus is mounted.

Moreover, in order to use the radar detection assistant apparatus more effectively, the radar signal may be intentionally transformed, and the intentionally transformed signal may be transmitted in such a manner that the radar device recognizes whether or not the radar detection assistant apparatus is present. The assistant apparatus production signal may be transformed to a form that the radar device is preset to support.

Figure 13:
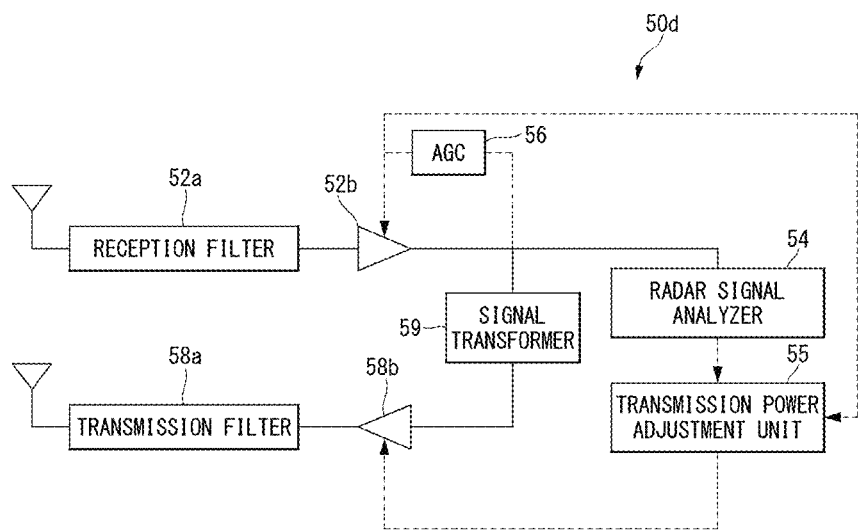
FIG. 13 is a schematic block diagram illustrating a configuration of a radar detection assistant apparatus according to a fifth embodiment in FIG. 2.
Figure 14:
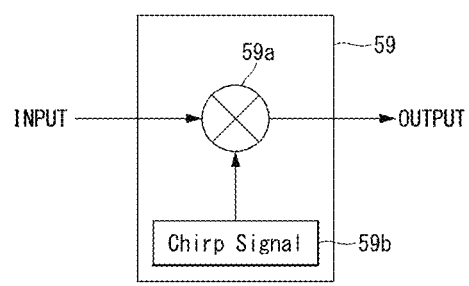
FIG. 14 is a schematic block diagram illustrating a signal transformer of the radar detection assistant apparatus in FIG. 13.
Figure 15:
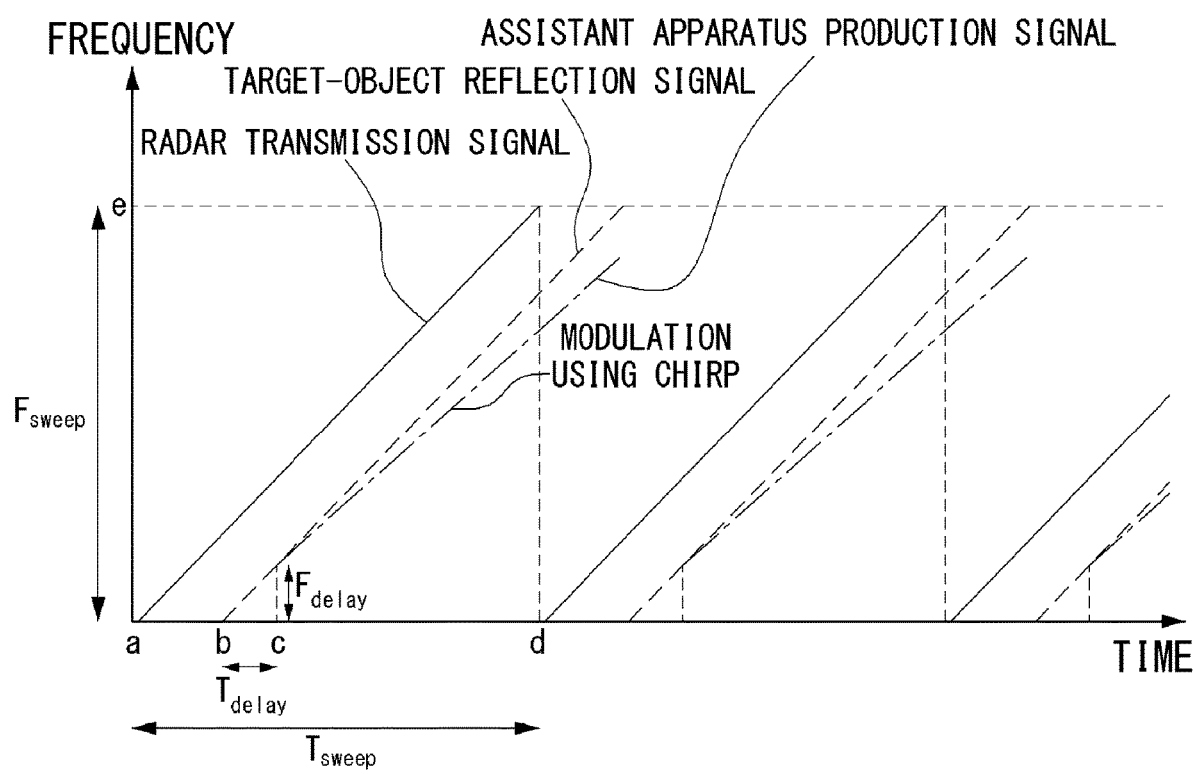
FIG. 15 is a graph illustrating a transformed form of the FMCW radar signal that results after the signal transformer of the radar detection assistant apparatus in FIG. 13 operates.
Figure 16A:
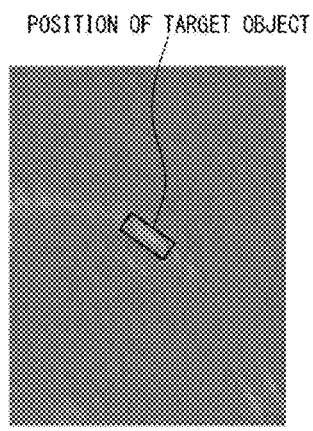
FIGS. 16A, 16B, and 16C are example views illustrating the effect of operation of the signal transformer of the radar detection assistant apparatus in FIG. 13.
Figure 16B:
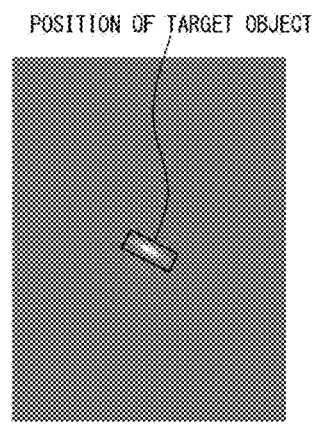
Figure 16C:
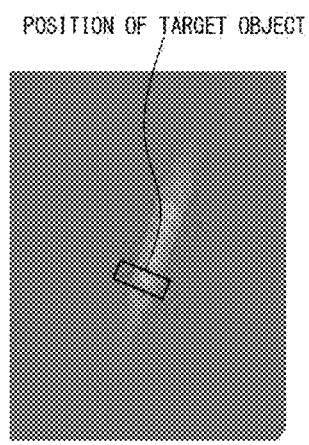

FIG. 13 is a schematic block diagram illustrating a configuration of a radar detection assistant apparatus according to a fifth embodiment in FIG. 2. FIG. 14 is a schematic block diagram illustrating a signal transformer of the radar detection assistant apparatus in FIG. 13. FIG. 15 is a graph illustrating a transformed form of the FMCW radar signal that results after the signal transformer of the radar detection assistant apparatus in FIG. 13 operates. Also, FIGS. 16A, 16B, and 16C are example views illustrating the effect of operation of the signal transformer of the radar detection assistant apparatus in FIG. 13.

With reference to FIG. 13, a radar detection assistant apparatus 50d includes the reception filter 52a connected to the reception antenna, the first amplifier 52b connected to the reception filter 52a, a signal transformer 59 connected to the first amplifier 52b, the second amplifier 58b connected to the signal transformer 59, the transmission filter 58a connected between the second amplifier 58b and the transmission antenna, the AGC 56 combined with the first amplifier 52b, the radar signal analyzer 54 connected to the output terminal of the first amplifier 52b, and the transmission power adjustment unit 55 connected to the radar signal analyzer 54.

The radar detection assistant apparatus 50d according to the present disclosure is configured in such a manner that the signal transformer 59 is installed between the radar signal receiver and the radar signal producer.

The signal transformer 59, as illustrated in FIG. 14, includes a mixer 59a connected between an input and an output and a chirp signal production unit 59b supplying a chirp signal to the mixer 59a. The chirp signal refers to a signal that varies in frequency and phase with time.

In the case of the FMCW radar, instead of using a single tone signal of an oscillator, using the chirp signal in following Equation 4, the signal transformer 59 not only performs the time delay compensation, but also transforms the signal.

Chirp signal$(t) = \cos(2\pi(F_{delay}t + S_{chirp} t^2) + \text{phase}) + C$ [Equation 4]

Where $F_{delay}$ depicts a frequency for compensating for the delay time of the radar detection assistant apparatus, $S_{chirp}$ depicts a setting value for adjusting an amount of transformation with respect to an original slope of the radar signal, phase depicts a phase of the chirp signal, and C depicts an arbitrary constant.

In Equation 2, when $S_{chirp}$ is zero, the signal transformer 59 may operate as if it were a delay compensator. Therefore, the signal transformer 59 performs the same function as the delay compensator.

That is, the chirp signal generated at specific time t may result from compensating for the delay time and may have a changed slope. With the changed slope, an assistant apparatus reproduction signal may be set to be different from the target-object reflection signal and thus may be distinguished therefrom. The assistant apparatus reproduction signal may refer to a signal that, among assistant apparatus production signals generated by the radar detection assistant apparatus 50d, results from compensating the delay time and has the changed slope.

For example, as illustrated in FIG. 15, a slope of the assistant apparatus reproduction signal is smaller than a slope of the target-object reflection signal with respect to the radar transmission signal. In this case, the assistant apparatus reproduction signal that results from compensating for the time delay with respect to the target-object reflection signal may be recognized in a manner that is easily distinguished from the radar device by the radar device and thus may be recognized.

In addition, an example of the effect of the signal transformer 59 is illustrated in FIGS. 16A to 16C. FIG. 16A illustrates an example of a radar image in a case where the radar detection assistant apparatus is not used. FIG. 16B illustrates an example of an image on the radar device 10 that results when only time delay is compensated for in the radar detection assistant apparatus 50d. From FIG. 16B, it can be seen that a function of and making the target object more clearly visible without a change in a position of the target object is performed, when compared with the case in FIG. 16A where the radar detection assistant apparatus is not used.

FIG. 16C illustrates the image on the radar device 10 that is obtained when using the radar detection assistant apparatus 50d that generates the assistant apparatus reproduction signal which results from the signal transformer 59 compensating for the time delay and has the signal slope changed by the signal transformer 59. When using the radar detection assistant apparatus including the signal transformer 59, the radar device may recognize that an original target object has a form that extends over a long distance in a radio-wave radial direction of the radar device by the radar detection assistant apparatus.

The form extending over a long distance in the radio-wave radial direction is a phenomenon that does not frequently occur, as recognition information of the target object, in a general target object or clutter. Therefore, using the foam extending over a long distance, detected by the radar reflection signal, the radar device may recognize a signal produced by the radar detection assistant apparatus for categorization. In addition, information on the target object in which the radar detection assistant apparatus is positioned may be displayed using a setting value of a slope of the chirp signal.

With a configuration of the present embodiment, the chirp signal may be set by the radar detection assistant apparatus in a manner that varies in slope with a type of the target object. Thus, the radar device may recognize the type of the target object in a manner that is distinguished according to the distance over which the form extends in the radio-wave radial direction or a pattern of the form.

Figure 17:
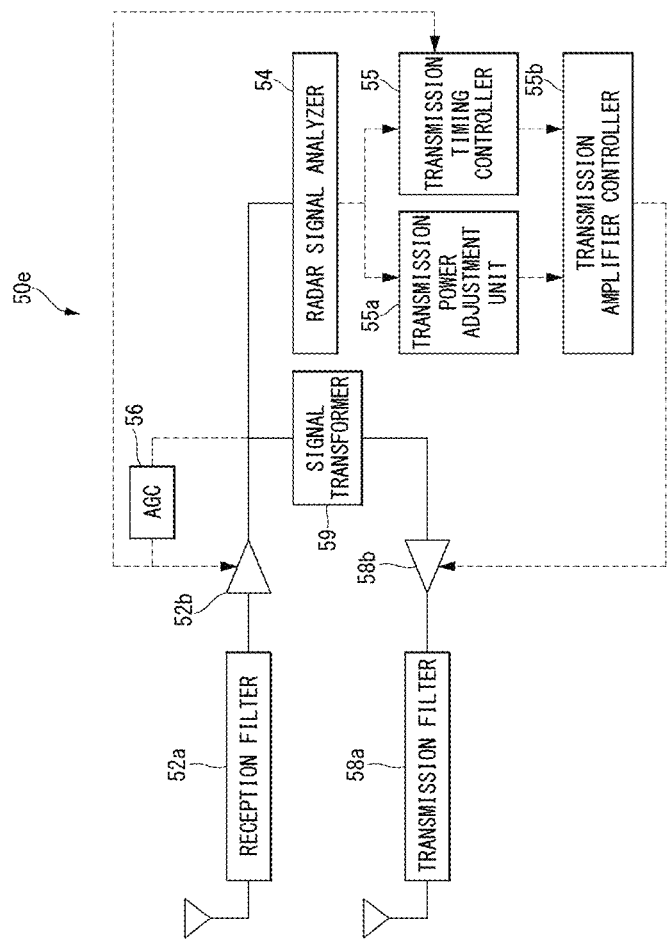
FIG. 17 is a schematic block diagram illustrating a configuration of a radar detection assistant apparatus according to a sixth embodiment in FIG. 2.
Figure 18:
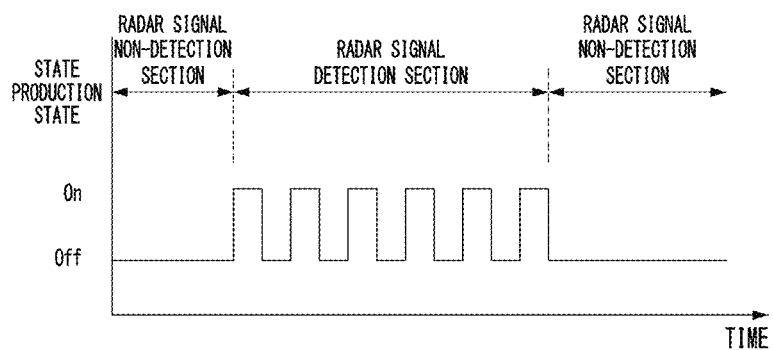
FIG. 18 is an example view illustrating a signal waveform for explaining the discontinuous signal generation principle of the radar detection assistant apparatus in FIG. 17.
Figure 19A:
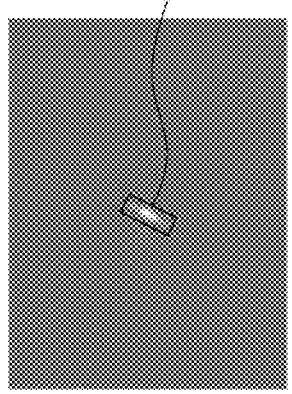
FIGS. 19A and 19B are example views illustrating the effect of operation by a flickering function of the radar detection assistant apparatus in FIG. 17.
Figure 19B:
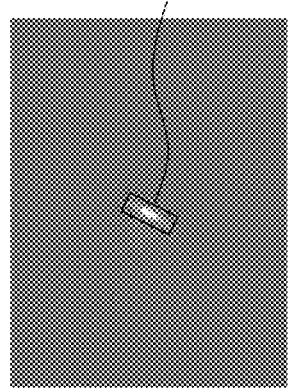
Figure 20A:
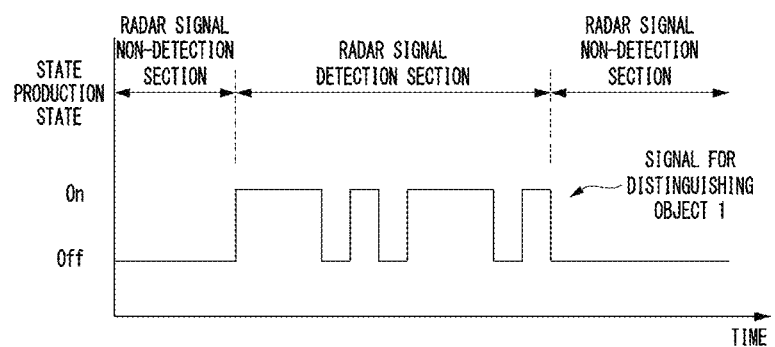
FIGS. 20A and 20B are exemplary views illustrating signal waveforms for explaining the operation principle of classifying an object using discontinuous signal generation in the radar detection assistant apparatus of FIG. 17.
Figure 20B:
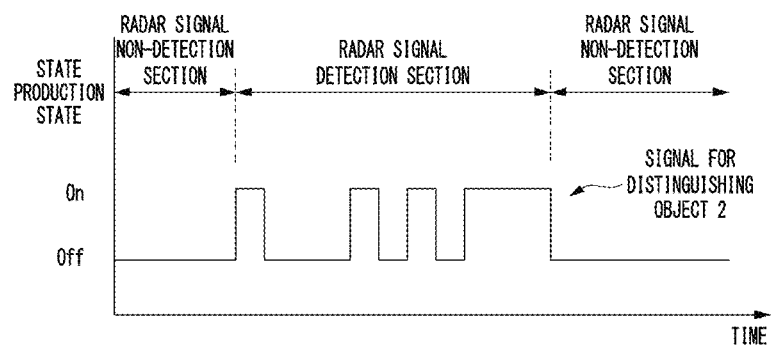

FIG. 17 is a schematic block diagram illustrating a configuration of a radar detection assistant apparatus according to a sixth embodiment in FIG. 2. FIG. 18 is an example view illustrating a signal waveform for explaining the discontinuous signal generation principle of the radar detection assistant apparatus in FIG. 17. FIGS. 19A and 19B are example views illustrating the effect of operation by a flickering function of the radar detection assistant apparatus in FIG. 17. FIGS. 20A and 20B are exemplary views illustrating signal waveforms for explaining the operation principle of classifying an object using discontinuous signal generation in the radar detection assistant apparatus of FIG. 17.

With reference to FIG. 17, an assistant apparatus 50e includes the reception filter 52a connected to the reception antenna, the first amplifier 52b connected to the reception filter 52a, the signal transformer 59 connected to the first amplifier 52b, the second amplifier 58b connected to the signal transformer 59, the transmission filter 58a connected between the second amplifier 58b and the transmission antenna, the AGC 56 combined with the first amplifier 52b, the radar signal analyzer 54 connected to the output terminal of the first amplifier 52b, the transmission power adjustment unit 55 and a transmission timing controller 55a, each being connected to the radar signal analyzer 54, and transmission amplifier controller 55b connected to each of the transmission power adjustment unit 55 and the transmission timing controller 55a.

The assistant apparatus 50e according to the present embodiment may be configured not only in such a manner that the assistant apparatus production signal or the assistant apparatus reproduction signal may be transmitted continuously or in a predetermined pattern, but also in such a manner that the assistant apparatus production signal or the assistant apparatus reproduction signal may be transmitted discontinuously or in a preset irregular pattern by switching a signal production state on or off or by adjusting a signal level.

For example, as illustrated in FIG. 18, the assistant apparatus 50e may periodically or intermittently switch on or off the state where the assistant apparatus production signal or the assistant apparatus reproduction signal is produced in a radar signal detection section and thus may cause the signal to flicker only in the radar signal detection section. Accordingly, the target object may be detected in the form of a flickering signal by the radar device.

For example, in a radar signal non-detection section, as illustrated in FIG. 19A, the assistant apparatus production signal or the assistant apparatus reproduction signal may be displayed in a light-turned-on state or maintains a predetermined-level signal. In the radar signal detection section, as illustrated in FIG. 19B, the assistant apparatus production signal or the assistant apparatus reproduction signal may be displayed in a flickering state. A flickering pattern of the assistant apparatus production signal or the assistant apparatus reproduction signal may be repeated, with a preset set period, in the radar signal detection section. In this manner, the flickering pattern may have a form that extends in the radio-wave radial direction along directions of relative movements of the target object and the radar device.

In addition, FIG. 19A may correspond to a case where the transmission timing is controlled using the transmission timing controller with respect to the assistant apparatus production signal generated using the delay compensator. FIG. 19B may correspond to a case where the transmission timing is controlled using the transmission timing controller with respect to the assistant apparatus production signal generated using the signal transformer.

When the effect in which the assistant apparatus production signal or the assistant apparatus reproduction signal flickers is used in this manner, it is possible that the radar device more effectively recognizes the radar detection assistant apparatus or the target object including the radar detection assistant apparatus, which is expressed as the image on the radar device 10 in a flickering way at the position of the target object, in a distinguished manner.

According to the present embodiment, the radar device 10 may greatly improve target object performance without implementing a complicated algorithm.

In addition, the transmission timing controller 55a may apply signal transmission timing that varies from one target object to another, without applying the transmission timing to all target objects. As an example, the transmission timing controller 55a, as illustrated in FIG. 20A, may control a signal (signal for distinguishing Object 1) turning-on duration and a signal turning-off duration in the radar signal detection section, using a specific first pattern, in order to distinguish Object 1 and, as illustrated in FIG. 20B, may control a signal (signal for distinguishing Object 2) turning-on duration and a signal turning-off duration in the radar signal detection section, using a specific second pattern in order to distinguish Object 2 different from Object 1.

In this manner, the assistant apparatus may be configured to set a flickering period of the assistant apparatus production signal or the assistant apparatus reproduction signal to vary with one type of the target object to another, according to a value input by a user from the outside or to prestored setting information, or a device, when manufactured, may be configured to set an initial flickering period to vary with one type of the target object to another.

That is, in a case where transmission timing varying with the type of the target object is applied, it is possible that the radar device 10 recognizes the target object according to a flickering state of the assistant apparatus production signal or the assistant apparatus reproduction signal and to a length of each of the sections in which the signal production state is switched on or off, or a change in the length, and identifies or distinguishes the type of the target object.

As described above, according to the present embodiments, in addition to the advantage that the radar, which is one of the important sensors in autonomous vehicles, can operate more stably in bad weather conditions than the other sensors, it can effectively solve the problem of increasing the accuracy of object identification due to its low resolution. In particular, it compensates for the disadvantage that the radar device detects metal materials well, but does not non-metal materials well, and helps to detect people and pets well in areas with a lot of parked vehicles. It can make a significant contribution to preventing the occurrence of safety accidents caused by autonomous vehicles, etc.

In addition, in a case where people carries a portable device in which the radar detection assistant apparatus is mounted, the vehicle equipped with the radar device may easily detect a person without error. Thus, the reliability for the safety of the people around the vehicle can be greatly improved.

In addition, the transformation of the signal makes it possible to identify the target object at the corresponding position as a person. Accordingly, a driver may be guided through safe driving, or the autonomous vehicle is enabled to easily detect and distinguish the target object, thereby contributing to significantly decreasing accidents due to poor performance or malfunction of a radar sensor.

The use of the assistant apparatus for improving radar signal detection performance according to the present disclosure can increase detection performance of a radar device even if a low-complexity radar detection algorithm is used.

In addition, according to the present disclosure, the realization of the radar detection assistant apparatus as one integrated with the portable device, such as the smartphone or the smartwatch, makes it possible for the radar device mounted in the vehicle to detect and distinguish the user carrying the portable device in a more successful manner, thereby effectively reducing the number of accidents due to malfunctioning of a sensor in a vehicle, such as an autonomous vehicle, or to careless driving by a driver of the vehicle.

While the present disclosure has been described above with respect to exemplary embodiments thereof, it will be apparent to those skilled in the art that various changes and modifications may be made without departing from the spirit and scope of the present disclosure defined in the following claims.

What is claimed is:
1. An assistant apparatus for improving radar signal detection performance, the assistant apparatus comprising:
   a radar signal receiver adjusting a radar candidate signal received through a reception antenna to a predetermined magnitude and filtering out a signal other than the radar candidate signal;
   a radar signal analyzer receiving the radar candidate signal from the radar signal receiver and determining whether or not the radar candidate signal is a preset radar signal;
   a radar signal production controller generating a control signal for an assistant apparatus production signal or an assistant apparatus reproduction signal on the basis of at least one of pieces of information on a type, a bandwidth, and a period of the radar candidate signal received from the radar signal analyzer;
   a radar signal producer activated by the radar signal production controller, generating the assistant apparatus production signal or the assistant apparatus reproduction signal according to the control signal of the radar signal production controller, and transmitting the assistant apparatus reproduction signal or the assistant apparatus production signal to the outside through a transmission antenna; and
   a delay compensator compensating for a time delay of the radar signal received from the radar signal receiver by adding a preset magnitude and outputting the resulting radar signal,
   wherein the delay compensator computes an amount of change in a beat frequency that corresponds to the time delay, and performs up-conversion of the amount of change in the beat frequency through a mixer.

2. The assistant apparatus of claim 1, wherein the radar signal analyzer determines whether or not the radar candidate signal is an actual radar signal, using a matched filter, a correlation technique, or a frequency characteristic of the radar signal.

3. The assistant apparatus of claim 1, wherein the radar signal producer comprises:
   a transmission power adjustment unit adjusting output signal power of a transmission amplifier included in the radar signal producer, on the basis of the control signal of the radar signal analyzer.

4. The assistant apparatus of claim 3, wherein the radar signal analyzer computes a gain of the transmission amplifier in a case where the radar signal is detected, and sets the gain of the transmission amplifier to zero or powers off the transmission amplifier in a case where the radar signal is not detected.

5. The assistant apparatus of claim 1, wherein the radar signal receiver comprises:
   a reception filter connected to the reception antenna;
   a reception amplifier connected to the reception filter; and
   an AGC (automatic gain control) uniformly controlling an output of the reception amplifier.

6. The assistant apparatus of claim 5, wherein the radar signal analyzer receives the radar candidate signal at a predetermined level adjusted by the AGC from the reception amplifier and transfers a magnitude of a radar signal detected from the radar candidate signal, or radar signal information including the magnitude of the radar signal, to a transmission power adjustment unit.

7. The assistant apparatus of claim 6, wherein the transmission power adjustment unit estimates received signal power of the radar signal using a control value of the AGC.

8. The assistant apparatus of claim 6, wherein the transmission power adjustment unit decreases a magnitude or strength of the assistant apparatus production signal or the assistant apparatus reproduction signal in a manner that is smaller than a predetermined magnitude or strength, using a small gain, in a case where the magnitude of the radar signal or strength of the radar signal that corresponds to the magnitude of the radar signal is above a first reference value, and increases the magnitude or the strength of the assistant apparatus production signal or the assistant apparatus reproduction signal in a manner that is greater than a currently set magnitude or strength of the radar signal, using a large gain, in a case where the magnitude of the radar signal or the strength of the radar signal that corresponds to the magnitude of the radar signal is below a second reference value.

9. The assistant apparatus of claim 1, wherein the delay compensator comprises:
   an oscillator producing a reference frequency, and
   a mixer compensating for the time delay of the radar signal using the reference frequency of the oscillator and outputting the assistant apparatus production signal.

10. The assistant apparatus of claim 1, further comprising:
   a signal transformer transforming the radar signal received from the radar signal receiver to a preset form and outputting the resulting radar signal.

11. The assistant apparatus of claim 10, wherein the assistant apparatus reproduction signal resulting from the transformation by the signal transformer has a different slope of a chirp signal than a target object reflection signal resulting from a radar transmission signal of an external radar device or a radar sensor reflecting off a target object, and thus is recognized, by the radar device, as a form that extends over a long distance in a radio-wave radial direction.

12. The assistant apparatus of claim 11, wherein the slope of the chirp signal is preset to vary from one type of the target object to another.

13. The assistant apparatus of claim 11, wherein, when the slope of the chirp signal is zero and the chirp signal has the same slope as the target object reflection signal, the signal transformer operates as a delay compensator that compensates for a time delay of the radar signal by adding a preset magnitude and outputs the resulting radar signal.

14. The assistant apparatus of claim 10, wherein the signal transformer comprises:
 a chirp signal producer producing a chirp signal; and
 a mixer outputting the assistant apparatus reproduction signal by transforming the radar signal using the chirp signal of the chirp signal producer.

15. The assistant apparatus of claim 1, further comprising:
 a transmission timing controller functioning in such a manner that the assistant apparatus production signal or the assistant apparatus reproduction signal flickers, by selectively switching a signal production state on or off in a radar signal-detection section that is one of the radar signal-detection section and a radar signal-non-direction section.

16. The assistant apparatus of claim 15, wherein the transmission timing controller differently controls a section in which the flickering occurs and a section in which the flickering does not occur, according to a type of a target object, in such a manner that the type of the target object that is a target for recognition is distinguished in the radar device.

17. The assistant apparatus of claim 15, further comprising:
 a transmission amplifier controller controlling operation of the radar signal generator or of a transmission amplifier of the radar signal generator on the basis of an output signal of a transmission power adjustment unit corresponding to the radar signal production controller or the radar signal production controller and an output signal of the transmission timing controller.

18. The assistant apparatus of claim 15, which is mounted in or attached to each of portable devices including a smartphone and a smartwatch.

\* \* \* \* \*